(12) United States Patent
Katchmart

(10) Patent No.: US 8,687,308 B1
(45) Date of Patent: Apr. 1, 2014

(54) ZONE SERVO WRITE WITH MULTI-FREQUENCY SELF-SPIRAL WRITE

(75) Inventor: Supaket Katchmart, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 380 days.

(21) Appl. No.: 13/151,125

(22) Filed: Jun. 1, 2011

Related U.S. Application Data

(60) Provisional application No. 61/350,785, filed on Jun. 2, 2010.

(51) Int. Cl.
*G11B 21/02* (2006.01)

(52) U.S. Cl.
USPC ................................. 360/55; 360/51; 360/75

(58) Field of Classification Search
None
See application file for complete search history.

(56) References Cited

U.S. PATENT DOCUMENTS

| | | | |
|---|---|---|---|
| 4,894,734 A | 1/1990 | Fischler et al. | |
| 5,193,034 A | 3/1993 | Tsuyoshi et al. | |
| 5,668,679 A | 9/1997 | Swearingen et al. | |
| 6,084,738 A | 7/2000 | Duffy | |
| 6,965,489 B1 | 11/2005 | Lee et al. | |
| 7,209,312 B1 | 4/2007 | Sutardja | |
| 7,307,807 B1 | 12/2007 | Han et al. | |
| 7,414,809 B2 * | 8/2008 | Smith et al. | 360/77.08 |
| 7,502,197 B1 * | 3/2009 | Chue | 360/48 |
| 7,580,216 B1 | 8/2009 | Han et al. | |
| 7,639,446 B2 * | 12/2009 | Mizukoshi et al. | 360/75 |
| 7,679,852 B2 * | 3/2010 | Shaver et al. | 360/51 |
| 7,751,144 B1 | 7/2010 | Sutardja | |
| 7,760,459 B1 | 7/2010 | Han et al. | |
| 8,027,117 B1 * | 9/2011 | Sutardja et al. | 360/75 |
| 8,068,304 B1 * | 11/2011 | Cheung et al. | 360/75 |
| 8,169,735 B1 * | 5/2012 | Sutardja et al. | 360/75 |
| 8,462,458 B1 * | 6/2013 | Ton-That et al. | 360/75 |
| 2009/0086357 A1 * | 4/2009 | Ehrlich | 360/55 |
| 2011/0176400 A1 * | 7/2011 | Gerasimov | 369/47.15 |

OTHER PUBLICATIONS

Smith, The Scientist and Engineer's Guide to Digital Signal Processing, Chapter 8, "The Discrete Fourier Transform", 1997, California Technical Publishing, pp. 141-168.

* cited by examiner

*Primary Examiner* — Wayne Young
*Assistant Examiner* — James L Habermehl

(57) ABSTRACT

In one aspect, systems, apparatuses and techniques obtain, through read circuitry, timing information for a machine-readable medium to determine head position; and write, by write circuitry, a first set of spiral servo reference tracks at a first frequency on a first zone of the medium and a second set of spiral servo reference tracks at a second, different frequency on a second zone of the medium. The second zone may be different from the first zone. Further, at least one of the first and second sets of spiral servo reference tracks may be written to the medium based on at least the timing information.

20 Claims, 12 Drawing Sheets

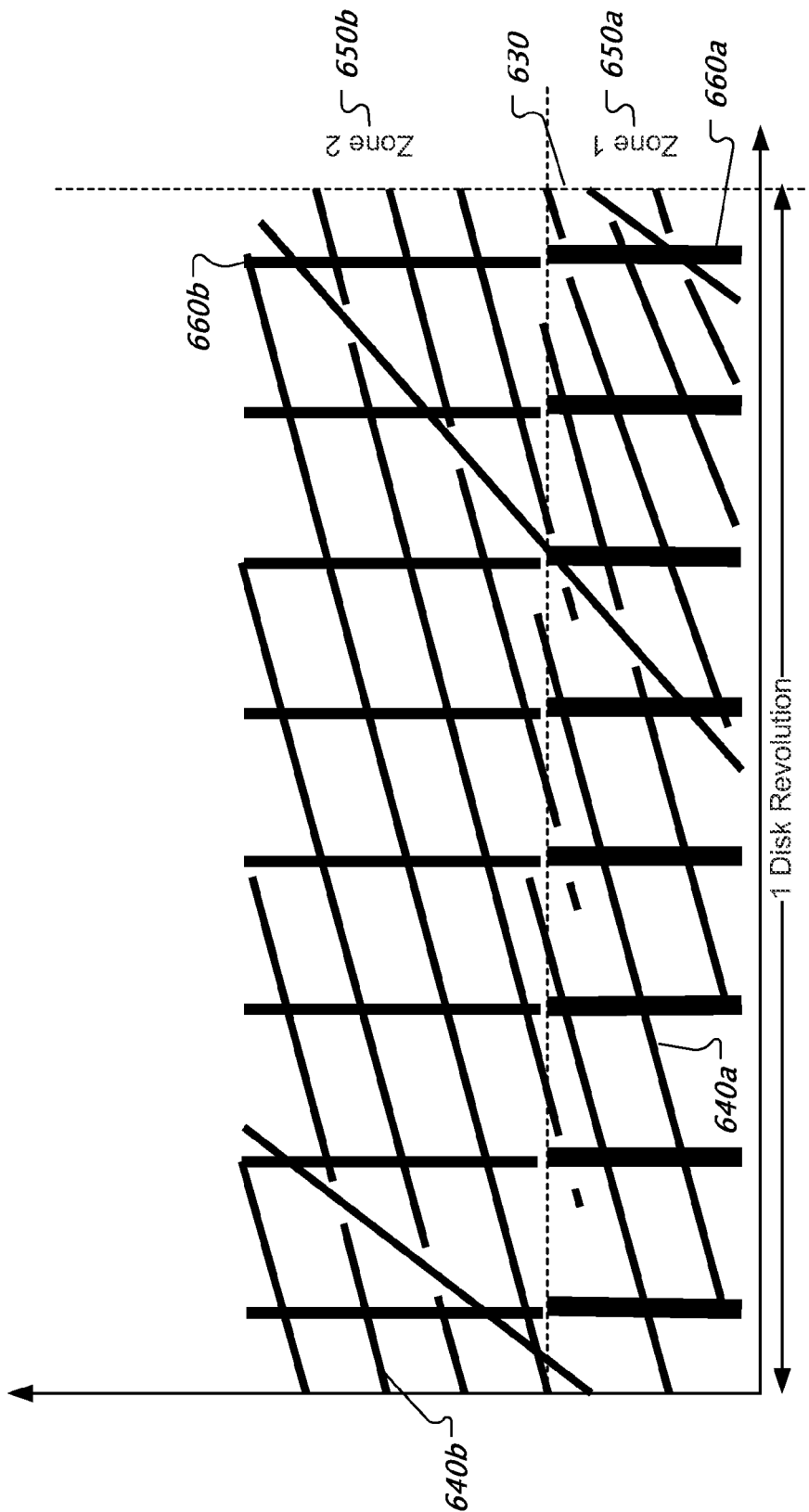

US 8,687,308 B1

ZONE SERVO WRITE WITH MULTI-FREQUENCY SELF-SPIRAL WRITE

CROSS REFERENCE TO RELATED APPLICATIONS

This application claims the benefit of the priority of U.S. Provisional Application Ser. No. 61/350,785, filed Jun. 2, 2010 and entitled "Zone Servo Write with Multi-Frequency Self Spiral Write." The disclosure of the above application is incorporated herein by reference in its entirety.

BACKGROUND

The present disclosure describes systems and techniques relating to disk servo pattern writing, for example, zone servo writing with multi-frequency self-spiral writing.

In magnetic-medium-based storage devices, data is typically stored on circular, concentric tracks on a magnetic medium surface, and a read/write head retrieves and records data on the magnetic layer of the disk. To guarantee the quality of the information saved on and read back from the disk, the read/write head should be accurately positioned at the center of the track during both writing and reading. In some implementations, certain information known as servo information can be written to a dedicated portion of every track of the recording surface. A closed-loop servo system can then use the written servo information contained in the tracks of the recording surface to accurately position the head and follow the track. As such, the servo information embedded in the recording surface should be accurately written for a read/write head servo system to operate properly.

SUMMARY

The present disclosure includes systems, apparatuses and techniques for operating a recording device, such as a disk drive.

According to an aspect of the present disclosure, the systems, apparatuses and techniques obtain, through read circuitry, timing information for a machine-readable medium to determine head position; and write, by write circuitry, a first set of spiral servo reference tracks at a first frequency on a first zone of the medium and a second set of spiral servo reference tracks at a second, different frequency on a second zone of the medium. The second zone may be different from the first zone. Further, at least one of the first and second sets of spiral servo reference tracks may be written to the medium based on at least the timing information.

In some implementations, the systems and techniques can include the following features. The systems and techniques can further include obtaining the timing information from seed spiral servo reference tracks written to the medium. The timing information can be first timing information and the systems and techniques can further include obtaining second timing information from the first set of spiral servo reference tracks; and writing a first set of concentric servo tracks to the medium based on at least the second timing information. The systems and techniques can further include controlling a head for writing the second set of spiral servo reference tracks by tracking one or both of the first set of concentric servo tracks and the seed spiral servo reference tracks. The first set of concentric servo tracks can be written to the medium at a same frequency as the first set of spiral servo reference tracks. A clock can be used to track the first set of spiral servo reference tracks, and the systems and techniques can also include writing the first set of concentric servo tracks to the medium based on the tracked first set of spiral servo reference tracks. The systems and techniques can also include obtaining third timing information from the second set of spiral servo reference tracks; and writing a second set of concentric servo tracks to the medium based on at least the third timing information, wherein the second set of concentric servo tracks is written to the medium at a same frequency as the second set of spiral servo reference tracks.

According to another aspect, a system can include signal processing circuitry configured to obtain timing information for a machine-readable medium to determine head position; and a servo track generator configured to generate a first set of spiral servo reference tracks at a first frequency on a first zone of the medium and a second set of spiral servo reference tracks at a second, different frequency on a second zone of the medium, wherein the second zone is different from the first zone; and wherein at least one of the first and second sets of spiral servo reference tracks is written to the medium based on at least the timing information.

According to another aspect, the systems and techniques include writing a first set of spiral servo reference tracks at a first frequency and a second set of spiral servo reference tracks at a second frequency on a machine-readable medium. The first set of spiral servo reference tracks is written to a first zone of the machine-readable medium and the second set of spiral servo reference tracks is written to a second zone of the machine-readable medium. In some implementations, the first and second zones belong to a plurality of zones disposed as concentric sections of the machine-readable medium extending from an inner diameter to an outer diameter.

A set of seed spiral servo reference tracks having a highly variable angle relative to a concentric section of a blank medium (i.e., ramp angle) can be written to the medium. Using the seed spiral servo reference tracks for timing, the first set of spiral servo reference tracks at the first frequency can be written to the first zone. A write head can then write a first set of servo tracks (also known as concentric servo tracks) to the first zone using timing information from the first set of spiral servo reference tracks to control the write head. The first set of servo tracks can be written to the first zone at a same frequency as the first set of spiral servo reference tracks. In some implementations, a clock tracking the first set of spiral servo reference tracks and a write clock guiding the write head for writing the first set of servo tracks can operate on the same frequency. In some implementations, a single clock can be used to provide timing for tracking the first set of spiral servo reference tracks and the write head for writing the first set of servo tracks. Once the first set of servo tracks are written, the first set of spiral servo reference tracks can be ignored and/or overwritten.

The first set of servo tracks and the set of seed spiral servo reference tracks can be used to determine a radial position of the read/write head and position the head to begin writing the second set of spiral servo reference tracks. The second set of spiral servo reference tracks can be written at a second frequency (that is different from the first frequency) to the second zone using the timing information from the set of seed spiral servo reference tracks. In some implementations, the second set of spiral servo reference tracks may overlap partially or completely the first set of spiral servo reference tracks written to the first zone. While writing the second set of spiral servo reference tracks to the second zone, care can be taken to skip (i.e., not overwrite) the set of seed spiral servo reference tracks and the first set of servo tracks. The write head can use the second set of spiral servo reference tracks and the first set of servo tracks to determine the boundary between the first and second zones. The read/write head can then be positioned at this boundary to begin writing the second set of servo tracks to the second zone using timing information from the second set of spiral servo reference tracks to control the head. The second set of servo tracks can be written to the second zone at the same frequency as the second set of spiral servo reference tracks. In some implementations, a clock tracking the second set of spiral servo reference tracks and a write clock guiding the write head for writing the second set of servo tracks can operate on the same frequency. In some implementations, a single clock can be used to provide timing for tracking the first set of spiral servo reference tracks and the write head for writing the first set of servo tracks. The frequency for writing the first set of servo tracks can be different from the frequency for writing the second set of servo tracks.

Details of one or more implementations are set forth in the accompanying drawings and the description below. Other features and advantages may be apparent from the description and drawings, and from the claims.

DRAWING DESCRIPTIONS

Figure 4B:
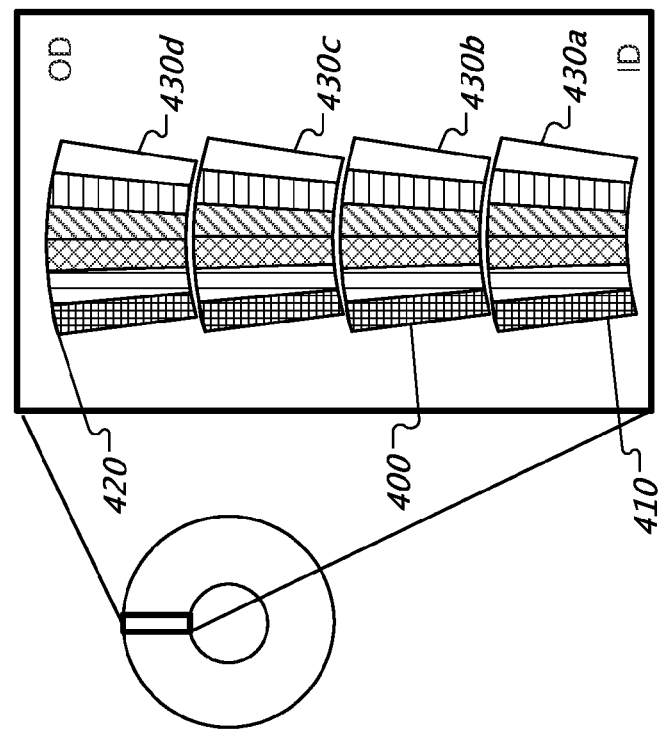
Figure 4A:
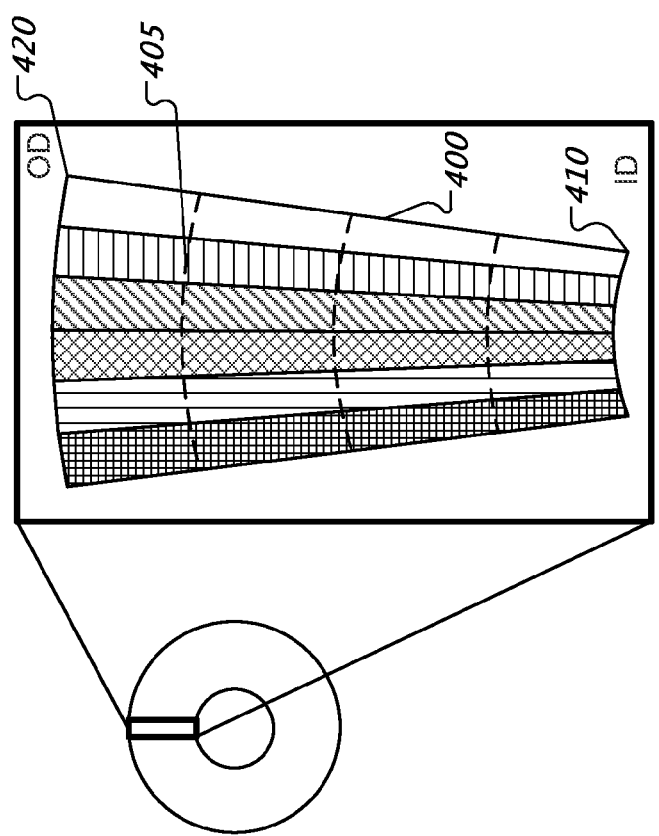

FIGS. 4A-B show examples of unzoned and zoned sections of a medium.

Figure 5B:
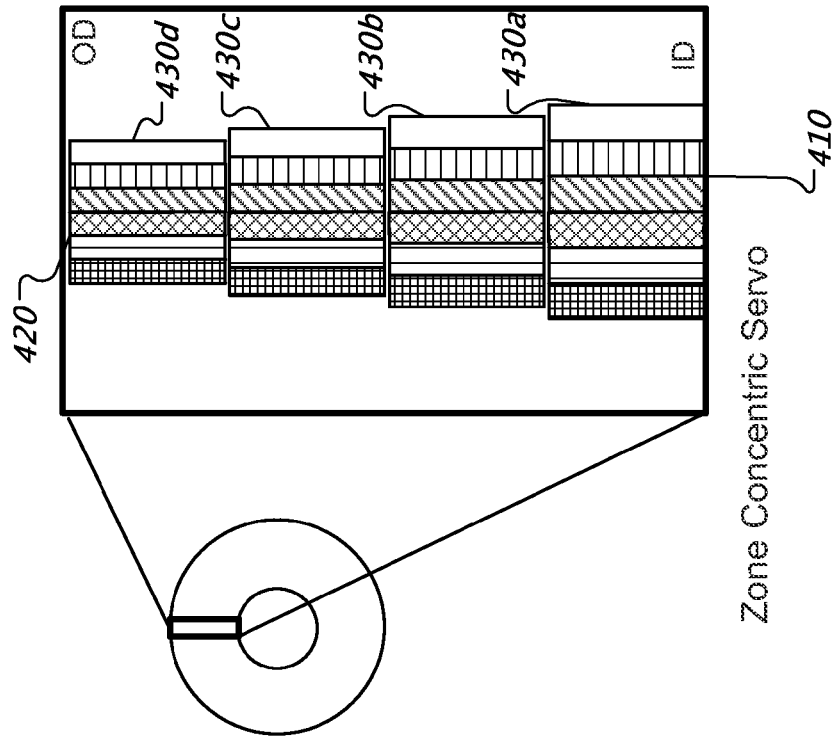
Figure 5A:
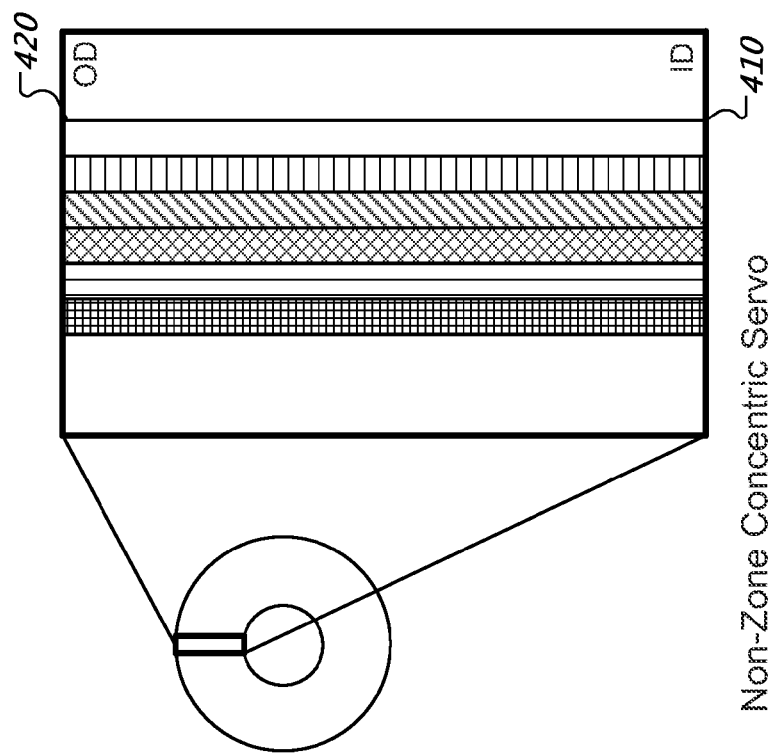

FIGS. 5A-B show examples of unzoned and zoned sections of a medium in time domain.

Figure 6:
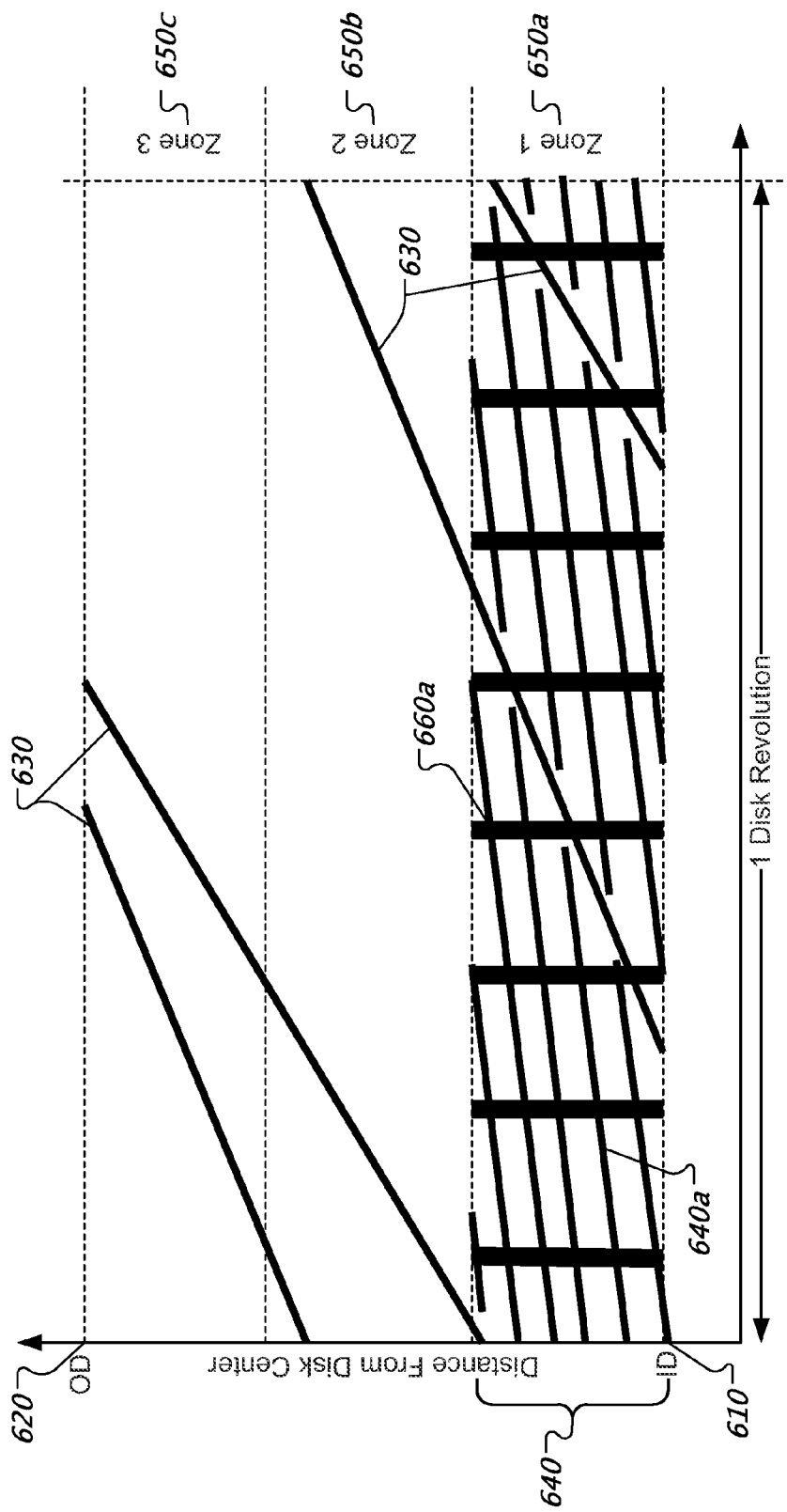
Figure 7:
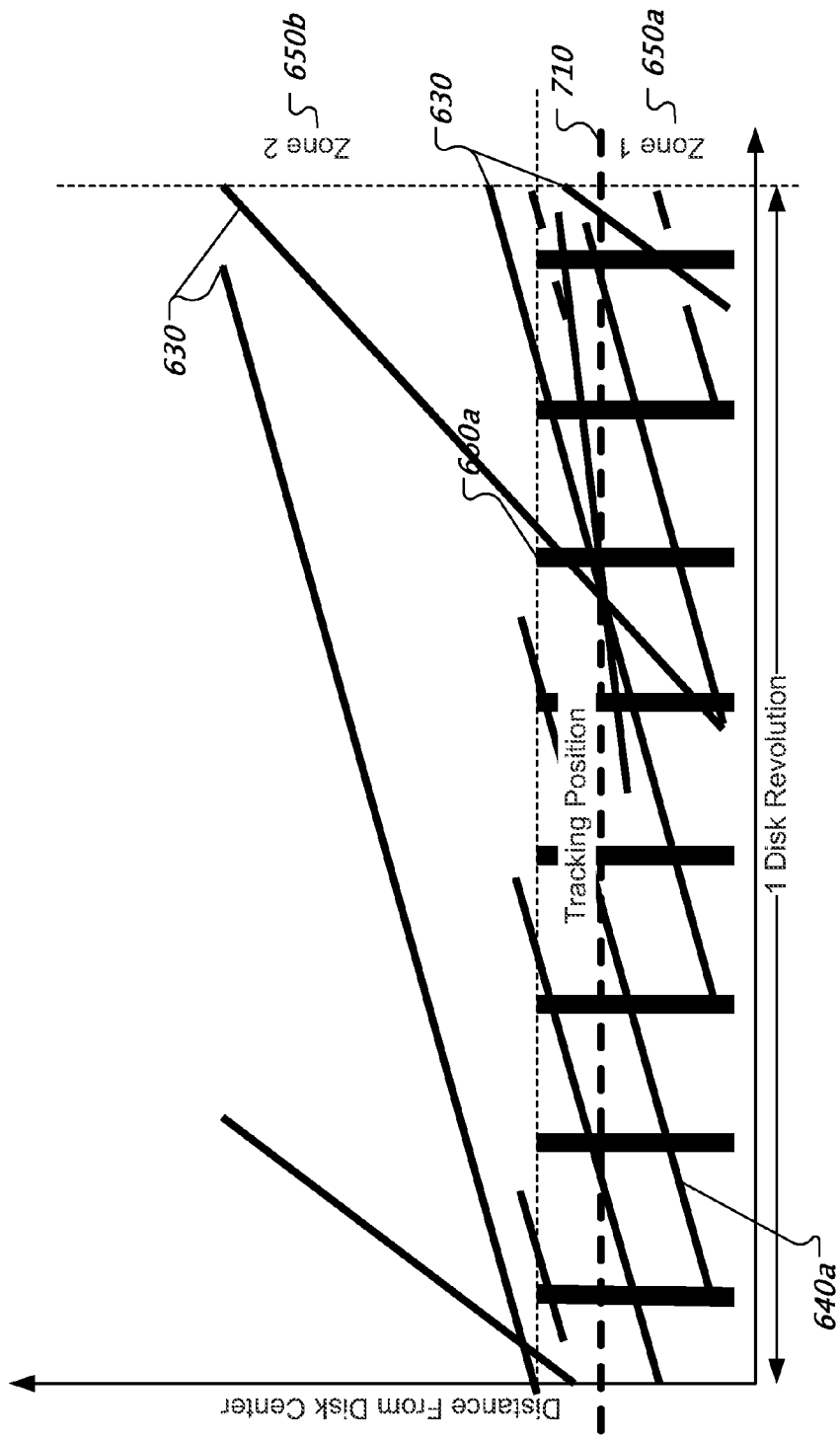

FIGS. 6-8 show examples of spiral servo information on a zoned medium.

Figure 9A:
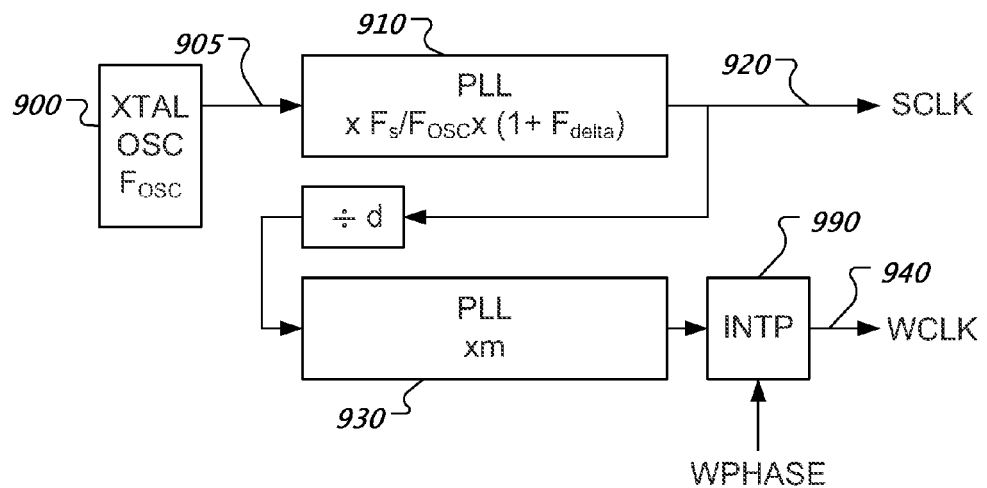
Figure 9B:
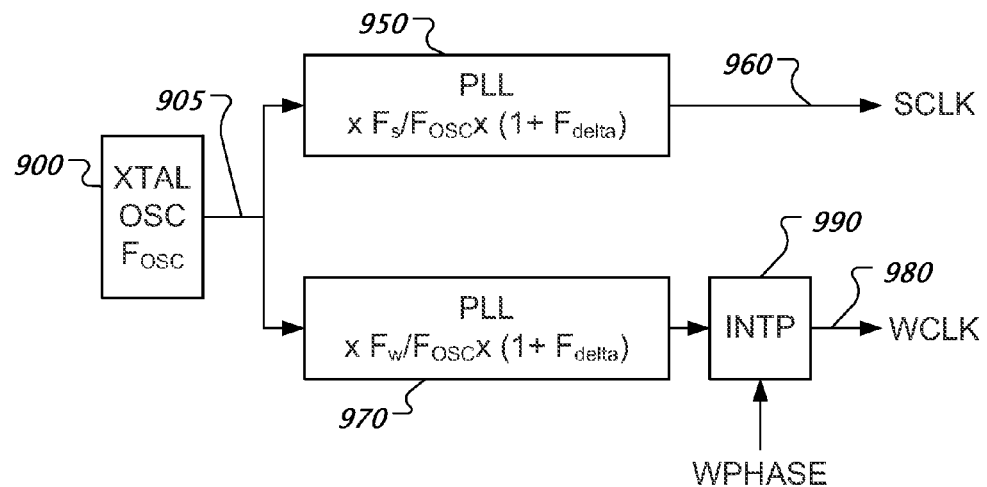

FIGS. 9A-B show examples of systems for generating servo read and write clock signals.

Figure 10:
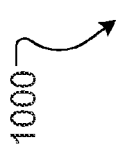

FIG. 10 is a table summarizing an example of clock usage details for each step of a spiral writing process.

Figure 11:
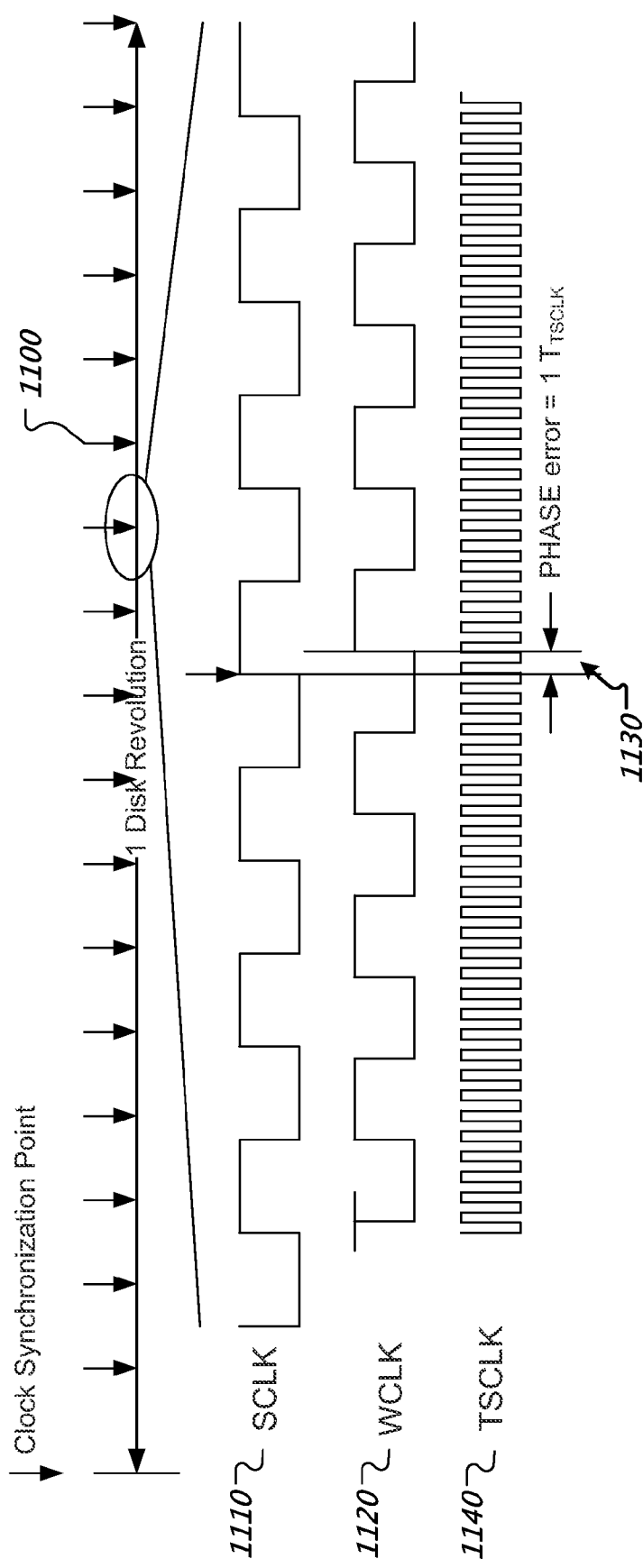

FIG. 11 shows an example of phase error measurement.

Figure 12:
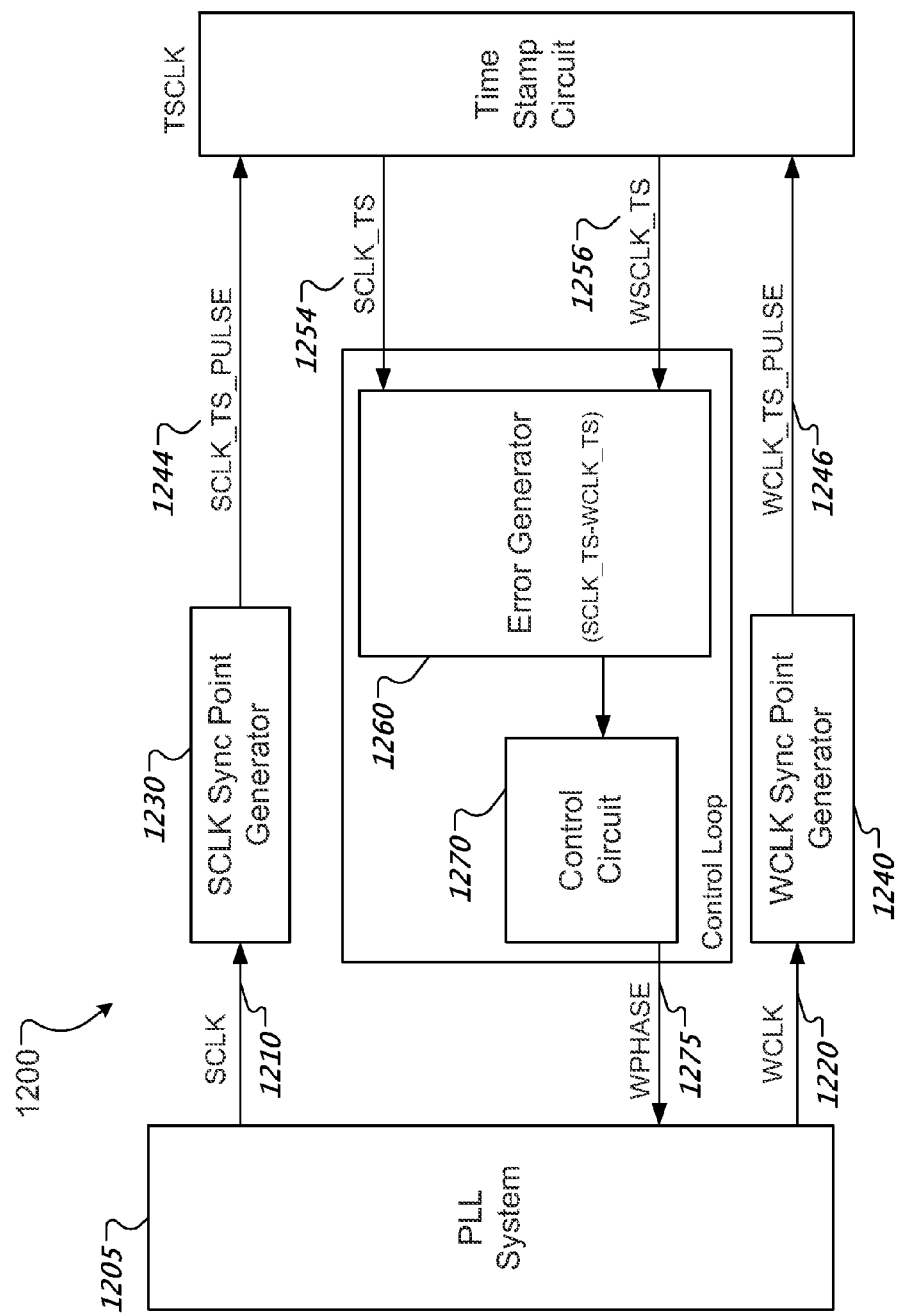

FIG. 12 shows an example of a magnetic-medium disk drive implementing a servo writing system.

Figure 13:
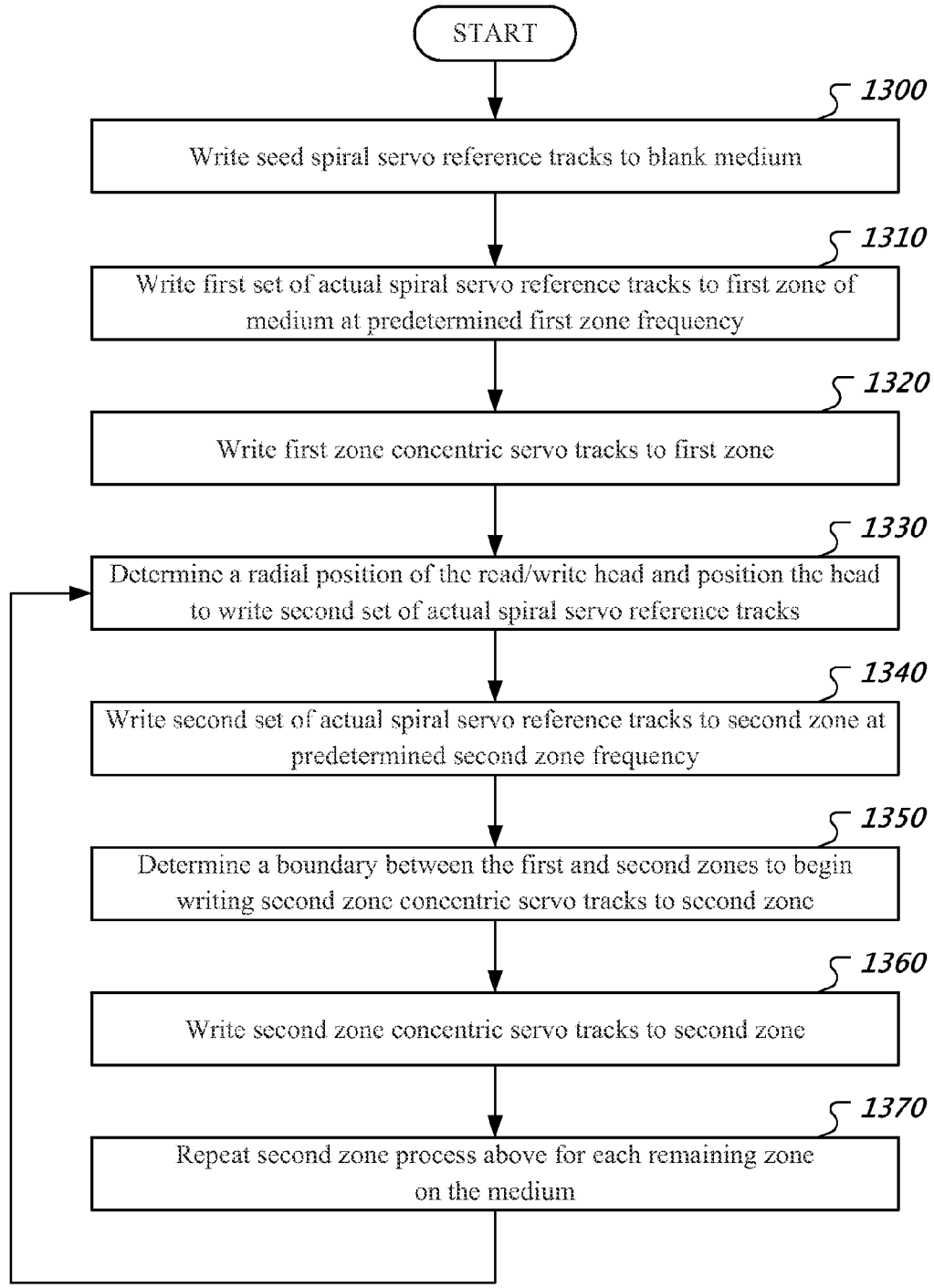

FIG. 13 is a flowchart showing an example of a zone servo writing process.

Like reference symbols in the various drawings indicate like elements.

DETAILED DESCRIPTION

Figure 1:
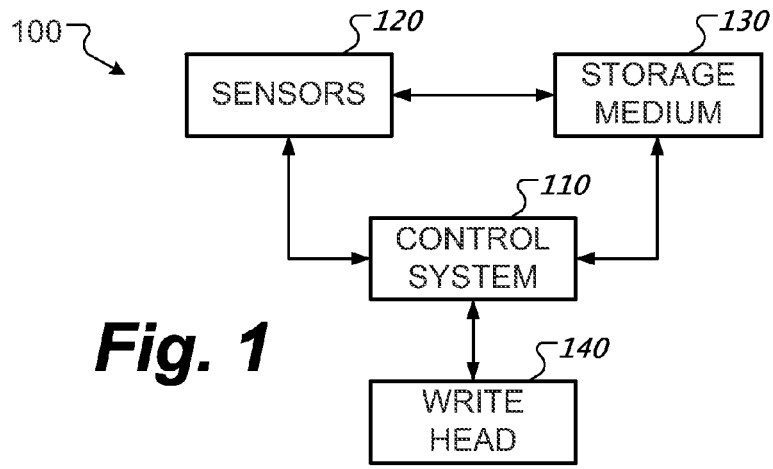
FIG. 1 shows an example of a self-servo pattern writing system.

FIG. 1 shows an example of a self-servo pattern writing system 100. The system 100 includes one or more sensors 120 used with an attached storage medium 130. For example, the storage medium 130 can be a platter in a disk drive. The one or more sensors 120 can locate a radial and circumferential position of a read/write head 140. A control system 110 can use information from the one or more sensors 120 to cause a read/write head to produce patterns of servo information on the storage medium 130. The system 100 can write servo information with a predetermined pattern from an outside diameter (OD) to an inside diameter (ID) on the storage medium 130 (e.g., disk surface) by moving the read/write head at a first predetermined velocity (e.g., a constant linear velocity) from OD to ID while the disk is spinning at a second predetermined velocity (e.g., a constant angular velocity). The servo information can then be used by the write head 140 or other data writing mechanism to provide timing for writing data on the disk.

Figure 2:
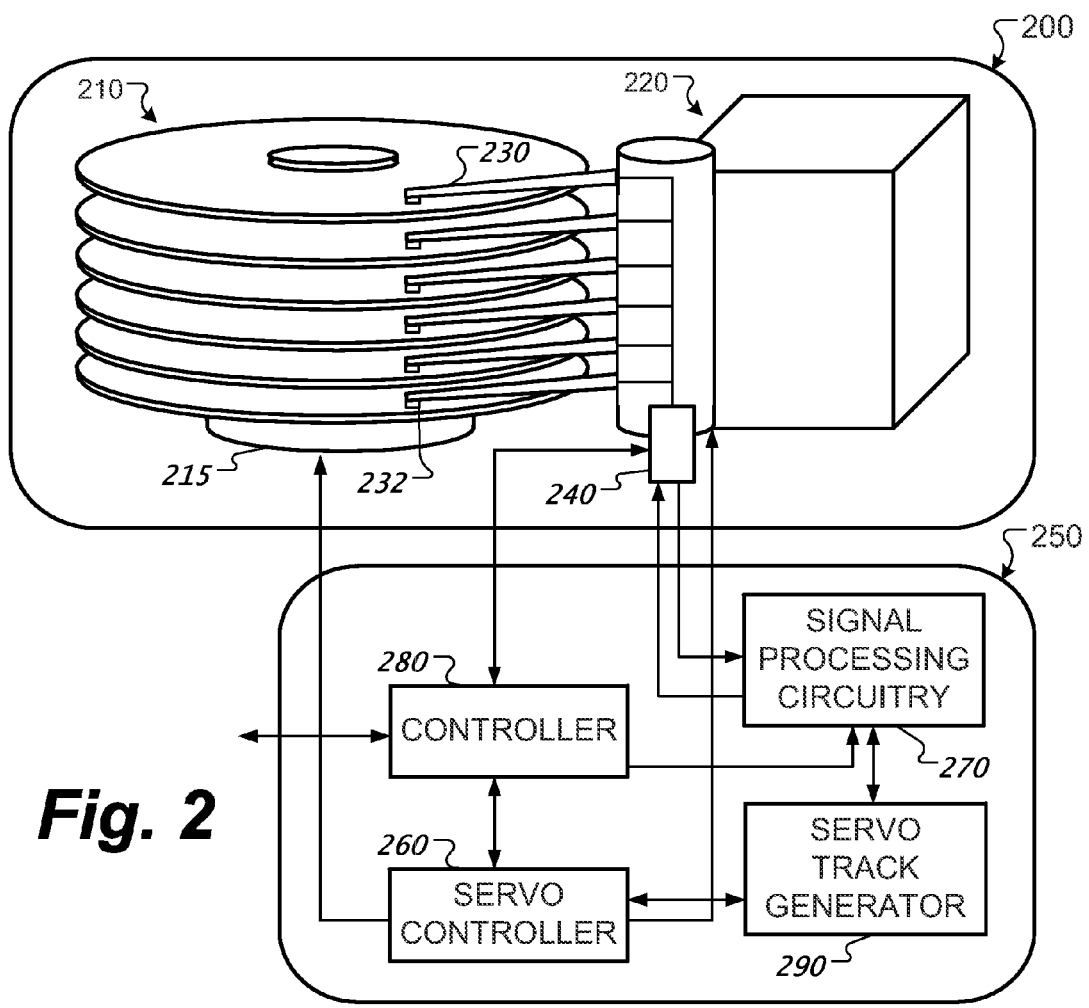
FIG. 2 shows an example of a magnetic-medium disk drive implementing a servo writing system.

FIG. 2 shows an example of a magnetic-medium disk drive implementing a servo writing system. The disk drive can include a head-disk assembly (HDA) 200 and drive electronics 250 (e.g., a printed circuit board (PCB) with semiconductor devices). The HDA 200 can include a plurality of disks 210 mounted on an integrated spindle and motor assembly 215. The motor assembly 215 can rotate the disks 210 near read/write heads 232 connected to a head assembly 220 in the HDA 200. The disks 210 can be coated with a magnetically hard material (e.g., a particulate surface or a thin-film surface) and can be written to or read from a single side or both sides of each disk.

The read/write heads 232 can be located on arms 230 and can be positioned as needed to read or write data on the disks 210. A motor (e.g., a voice coil motor or a stepper motor) can be used to position the heads 232 over desired tracks on the disks 210. The arms 230 can be pivoting or sliding arms and can be spring-loaded to maintain a proper flying height for the heads 232.

The HDA 200 can include a read/write chip 240, where head selection and sense current value(s) can be set. The read/write chip 240 can amplify a read signal before outputting it to signal processing circuitry 270. The signal processing circuitry 270 can include a read signal circuit, a servo signal processing circuit, and a write signal circuit.

In some implementations, signals between the HDA 200 and the drive electronics 250 can be conveyed over a cable. A controller 280 can direct a servo controller 260 to control mechanical operations of the HAD 200 such as head positioning through the head assembly 220 and rotational speed control through the motor assembly 215. The controller 280 can be one or more integrated circuit (IC) chips (e.g., a combo chip). In some implementations, the controller 280 can be a microprocessor based controller. The drive electronics 250 can also include various interfaces, such as a host-bus interface, and memory devices, such as a read only memory (ROM) for use by a microprocessor, and a random access memory (RAM) for use by a hard disk controller.

The HDA 200 and drive electronics 250 can be enclosed in a sealed container with an integral air filter. For example, the hard disk drive can be assembled using a Winchester assembly. The rotating platter can be driven by a brush-less DC motor, and the rotational frequency can be accurately servo-locked to a crystal reference.

The drive electronics 250 can include a servo track generator 290 that obtains timing information from spiral reference tracks on the machine-readable medium and writes spiral or concentric servo tracks on the machine-readable medium based on the obtained timing information. The servo track generator 290 can include read circuitry that operates with the read/write heads 232 for transforming a medium's magnetic field into electrical signals (i.e., read the disk). In some examples, the signals read from the medium can provide timing information for subsequent writing to the medium. The servo track generator 290 can also include write circuitry that operates with the read/write heads 232 to transform electrical signals into a magnetic field (i.e., write to the disk). In this manner, a self-servo process may allow servo tracks to be written sequentially at each servo radius of the disk. The servo track generator 290 can be composed of multiple sets of coordinating circuitry and can be integrated with one or more of the components described above or organized into a separate component of the disk drive. For example, the servo track generator 290 can be integrated into one or both of the controller 280 and the signal processing circuitry 270. The servo track generator 290 can generate servo reference tracks using the systems and techniques described below. The servo reference tracks can be written onto some or all platters in the HDA 200.

Figure 3:
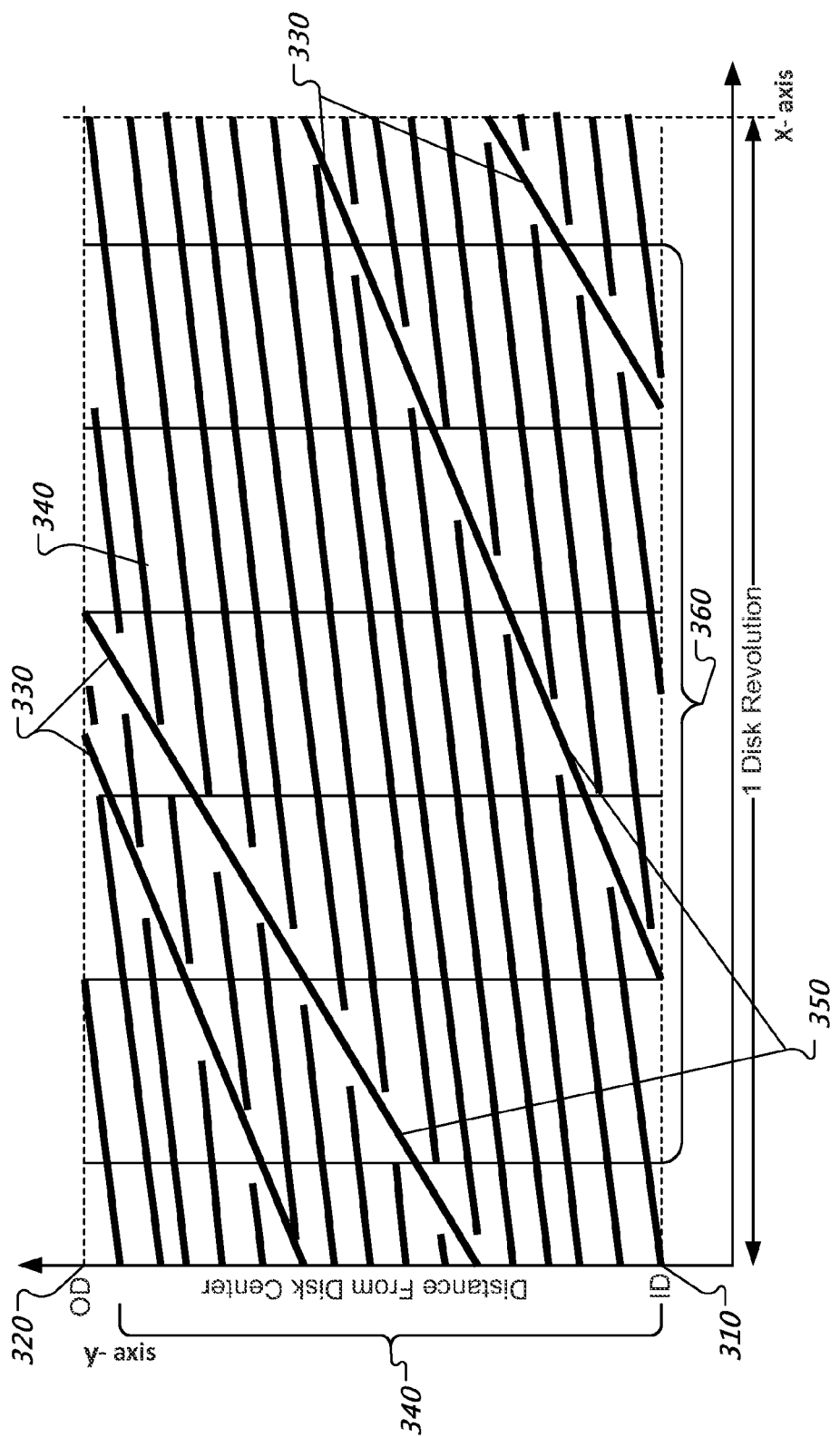
FIG. 3 shows an example of writing spiral servo information on a medium.

FIG. 3 shows an example of writing spiral servo information on a medium. For example, the medium can be a blank disk, e.g., a magnetic disk having no previous servo or data information. As shown, a single revolution of the medium surface can be represented along the x-axis, while the medium surface extending from an inner diameter (ID) 310 to an outer diameter (OD) 320 can be depicted along the y-axis. The revolution of the medium surface corresponds to a single rotation of the disk about a central axis. With a blank disk, the write head may not have the benefit of timing feedback at the time of writing preliminary servo information, e.g., seed spiral servo reference tracks 330. As such, a velocity of the write head 140 may not be precisely controllable, and thus the seed spiral servo reference tracks 330 may have and widely varying plurality of angles relative to a concentric section of the blank disk (i.e., highly variable ramp angles). In some implementations, a space between adjacent seed spiral servo reference tracks may be substantially wide in at least some portions of the disk to ensure that the tracks are not crossing each other. The seed spiral servo reference tracks 330 can be written with the aid of a timing signal generated by a time base generator (TBG), which may be time-locked to a period of disk rotation.

Once the seed spiral servo reference tracks 330 are written to the blank medium surface, spiral servo reference tracks 340 can be written to the medium surface. A velocity of the write head for writing the spiral servo reference tracks 340 can be controlled based on timing information derived from the seed spiral servo reference tracks 330. As such, the spiral servo reference tracks 340 can have shallower ramp angles relative to the ramp angles of the seed spiral servo reference tracks 330. In some implementations, the spiral servo reference tracks 340 can be written along the entire medium surface from ID 310 to OD 320. The spiral servo reference tracks 340 can have a plurality of discontinuities 350 where seed spiral servo reference tracks 330 may interrupt the spiral servo reference tracks 340. Subsequently, the write head can use the spiral servo reference tracks 340 to write concentric servo tracks 360 on the medium surface from ID 310 to OD 320. In some implementations, a servo writing system (e.g., head-disk assembly (HDA) 200 and drive electronics 250 of FIG. 2) can be aware of the discontinuities 350 and use the seed spiral servo reference tracks 330 to properly position the write head both radially and circumferentially. Accordingly, the write head should be aware of both the seed spiral servo reference tracks 330 and the spiral servo reference tracks 340 while writing the concentric servo tracks 360.

In the servo writing process described above, sampling frequency of the patterns in the servo information is constant from ID 310 to OD 320. On the other hand, bit density of the servo information written on the medium surface varies from having relatively high bit density near the ID 310 to having relatively low bit density near the OD 320. As a result, a quality of the performance of the servo writing system can vary from ID 310 to OD 320. For example, the servo writing system can perform better at sections of the medium surface near the ID 310 having higher bit density. To address these inconsistencies, the medium surface from ID 310 to OD 320 can be divided into a plurality of concentric zones. Each zone can be configured to have a similar bit density of the servo information. Further, each zone can have a sampling frequency that can be constant within the zone, and the sampling frequency can vary in a predetermined manner while traversing from zones near the ID 310 to zones near the OD 320. In this manner, there may be no need for disk space near the OD 320 to be wasted in an effort to improve performance near the ID 310. In addition, a lower variation of bit density from ID 310 to OD 320 can result in more consistent channel response.

FIGS. 4A-B show examples of unzoned and zoned sections 400, 400' of a medium. In the unzoned section 400 of the disk (FIG. 4A), the density of information stored on the disk area near the ID 410 relative to the density of the information stored on the disk near the OD 420 is graphically illustrated by vertical lines 405 in the section 400. The distance between the lines 405 near the ID 410 is less than the distance between the lines 405 near the OD 420. Accordingly, the density of information near the ID 410 is higher than the density of information near the OD 420.

Referring to FIG. 4B, the medium surface between ID 410 and OD 420 can be zoned into concentric regions or zones 430a-d having similar densities of stored information. A suitable number of zones can be selected such that a variation of bit density from a bottom of a zone to a top of a zone is small. To maintain substantially similar densities between the different zones, the write frequency may be increased in traversing the zones from ID 410 to OD 420. For example, data densities may remain consistent at e.g., 1× at ID 410 and 1× at OD 420, for a surface that is zoned into concentric regions. In an unzoned surface, data densities may range from 1× at ID 410 to about 0.5× at OD 420.

For a same period of time, at OD 420 the write head has to travel further (in terms of linear distance). Accordingly, the data density is lower. To improve efficiency, the write frequency can be scaled to achieve a uniform density on the surface from ID 410 to OD 420. For example, the write frequency may be varied from zone to zone to maintain a same density (e.g., linear density) of write pattern. As a result, the write frequency can vary from low frequency in areas near the ID 410 to high frequency in areas near the OD 420.

FIGS. 5A-B show examples of unzoned and zoned sections of a medium in time domain. The vertical lines provide a graphical representation of the relative write frequencies from ID 410 to OD 420. As shown, in FIG. 5A, the write frequency may be kept constant from ID 410 to OD 420. In FIG. 5B, the write frequency may be increased from one zone to another along a radial length of the disk from ID 410 to OD 420.

FIGS. 6-8 show examples of spiral servo information on a zoned medium. A single revolution of the medium surface can be represented along the x-axis, while the medium surface extending from ID 610 to OD 620 can be depicted along the y-axis. As discussed above, preliminary servo information known as seed spiral servo reference tracks 630 can be written to a blank medium. The seed spiral servo reference tracks 630 can have highly variable ramp angles.

Once the seed spiral servo reference tracks 630 are written to the blank medium surface, spiral servo reference tracks 640 can be written separately to different zones 650a-c of the medium surface. A first set of spiral servo reference tracks 640a can be written to a first zone 650a of the medium surface. A velocity of the write head for writing the first set of spiral servo reference tracks 640 can be controlled based on timing information derived from the seed spiral servo reference tracks 630. It should be noted that the zone boundaries that define the plurality of zones 650a-c between ID 610 and OD 620 are approximate and as such the spiral servo reference tracks 640 may overlap into the second zone 650b.

The first set of spiral servo reference tracks 640a are written in the first zone 650a (for example, zone 430a of FIGS. 4-5) at a first predetermined servo frequency generated by a servo frequency generator. A time base generator signal locked to disk rotation can be used to provide timing to track the seed spiral servo reference tracks 630. In some implementations, a frequency offset between the time base generator signal and the servo frequency can be locked by use of a phase lock circuit. Once the first set of spiral servo reference tracks 640a are written, a first set of concentric servo tracks 660a can be written in the first zone 650a up to a boundary between the first and second zones. The first set of concentric servo tracks 660a can be written at a same predetermined servo frequency that was used to write the first set of spiral servo reference tracks 640a. In some implementations, a same clock source can be used for both tracking the first set of spiral servo reference tracks 640a and writing the first set of concentric servo tracks 660a. For example, a time base generator source can be used for both tracking the first set of spiral servo reference tracks 640a and writing the concentric servo tracks 660a. One advantage of using the same clock source can be the elimination of a need to maintain phase coherency between a clock source for tracking the first set of spiral servo reference tracks 640a and another clock source for writing the first set of concentric servo tracks 660a.

When the first set of concentric servo tracks 660a are written, spiral writing for the first zone 650a of the disk surface can be deemed complete. At this point, the first set of spiral servo reference tracks 640a may be ignored and/or overwritten. Spiral writing for the second zone 650b (for example, zone 430b of FIGS. 4-5) can be performed in a similar manner as described above with reference to the first zone 650a. A second set of spiral servo reference tracks 640b can be written to the second zone 650b at a second predetermined servo frequency.

Referring now to FIG. 7, the spiral writing for the second zone 650b can be initiated based on one or both of the first set of concentric servo tracks 660a and the seed spiral servo reference tracks 630. Along these lines, an initial radial and circumferential position of the read/write head can be determined by tracking one or both the first set of concentric servo tracks 660a and the seed spiral servo reference tracks 630. In one implementation, a read/write head begins tracking its radial position 710 based on the first set of concentric servo tracks 660a from well within the first zone 650a. Once the initial position of the read/write head is determined, the read/write head can switch to tracking the seed spiral servo reference tracks 630 only.

In operation, a spiral detector algorithm (executed, for example, within the servo track generator 290 of FIG. 2) can be run to first detect the seed spiral servo reference tracks 630 ($F_{spiral}=F_{seed}$). For example, the read/write can track the seed spiral servo reference tracks 630 by varying its radial position on the medium surface. Next, a concentric servo detector algorithm can be run on the first zone concentric servo tracks 660a ($F_{srv}=F_{zone1}$). In this manner, the read/write head is able to detect locations of the first zone concentric servo tracks 660a with respect to the seed spiral servo reference tracks 630.

FIG. 8 shows writing a second set of spiral servo reference tracks 640b at a second predetermined servo frequency to the second zone 650b. The spiral detector algorithm can be run to detect the seed spiral servo reference tracks 630 ($F_{spiral}=F_{seed}$). Then, the second set of spiral servo reference tracks 640b can be written to the medium surface using the servo frequency ($F_{spiral-write}=F_{zone2}$). In some examples, the second set of spiral servo reference tracks 640b may overlap into the first zone 650a. While tracking the second set of spiral servo reference tracks 640b at the second predetermined servo frequency, spiral servo reference tracks that are at a different servo frequency (e.g., the first predetermined servo frequency) can be ignored.

After the second set of spiral servo reference tracks 640b has been written, a second set of concentric servo tracks 660b can be written in the second zone 650b up to a boundary between the second and third zones. In operation, the spiral detector algorithm can be run again to detect the second set of spiral servo reference tracks 640b ($F_{spiral}=F_{zone2}$). Further, a concentric servo detector algorithm can be run on the first zone concentric servo tracks 660a ($F_{srv}=F_{zone1}$). In this manner, the read/write head is able to determine a relationship between the second set of spiral servo reference tracks 640b and the first zone concentric servo tracks 660a, and also establish the boundary between the first and second zones. Finally, a starting point for the second set of concentric servo tracks 660b can be determined based on timing information derived from tracking the second set of spiral servo reference tracks 640b.

The second set of concentric servo tracks 660b can be written at a same predetermined servo frequency that was used to write the second set of spiral servo reference tracks 640b. Once again, the spiral detector algorithm can be run to detect the second set of spiral servo reference tracks 640b ($F_{spiral}=F_{zone2}$), and second set of concentric servo tracks 660b can be written at the same second zone frequency ($F_{spiral-write}=F_{zone2}$). In some implementations, a same clock source can be used for both tracking the second set of spiral servo reference tracks 640b and writing the second set of concentric servo tracks 660a.

The write frequency for writing the second set of spiral servo reference tracks 640b and the second set of concentric servo tracks 660b in the second zone 650b (e.g., zone 430b of FIG. 5B) is greater than the write frequency for writing the first set of concentric servo tracks 640a and the first set of concentric servo tracks 660a in the first zone 650a (e.g., zone 430a of FIG. 5B). In this manner, the write frequency corresponding to each of the zones 430c-d, etc., increase radially along the medium surface from ID 410 to OD 420. For example, the write frequency may be varied from zone to zone to maintain a same density of write pattern. In some implementations, the frequencies may be multiples of a predetermined fixed based frequency.

In some implementations, as the read/write head moves across the medium surface, a back electromotive force (BEMF) signal is generated in the spindle motor that controls the disk spindle. In some implementations, a profile of the BEMF pulse can be governed by spindle motor structure, and as such, the pattern of the BEMF pulse may be related to an angular position of the motor. As such, the BEMF signal can be used to determine angular position and control the angular velocity of the read/write head. Using the BEMF signal, a clock for tracking seed spiral servo reference tracks can be synchronized to the rotation of the disk. In some examples, a clock for providing timing signals to the write head for writing a first set of spiral servo reference tracks can be locked to the clock for tracking the seed spiral servo reference tracks. In some implementations, a frequency for writing the first set of spiral servo reference tracks can be different from a frequency for tracking the seed spiral servo reference tracks.

Frequencies for the read and write clocks controlling the read/write head can be selected based on a predetermined scheme. For example, a number clock counts for seed spiral servo reference tracks per disk revolution can be selected to be an integer. A number of clock counts for the spiral servo reference tracks per disk revolution can be a integer. A number of clock counts for the spiral servo reference tracks per disk revolution can be a multiple of clock counts used for writing concentric servo tracks. In some implementations, there can be an integer number of clock cycles between two adjacent concentric servo tracks.

FIGS. 9A-B show examples of systems for generating servo read and write clock signals. As shown, signals from a clock oscillator 900 (e.g., a crystal oscillator) having frequency $F_{osc}$ can be provided to one or more phase-locked loop (PLL) circuits, e.g., PLL circuits 910, 930 of FIG. 9A and PLL circuits 950, 970 of FIG. 9B. Referring to FIG. 9A, a first PLL circuit 910 receives the clock oscillator signal 905 and generates a clock signal 920 that can be used, for example, to track seed spiral reference tracks on the medium surface. The first PLL circuit 910 is a closed loop frequency control system that detects a phase difference between the clock signal 905 and a reference signal (not shown). The reference signal is used to control a frequency and phase of the generated clock signal 920 for tracking the seed spiral reference tracks. As such, the generated clock signal 920 may be at the same frequency as the clock signal 905 or at a fractional or multiple frequency of the clock signal 905. For example, a frequency of the output clock signal 920 ($F_{SCLK}$) can be calculated based on the expression $F_{SCLK}=F_{osc} \times F_s / F_{osc} \times (1+F_{delta})$. $F_s$ represents a target base frequency for the spiral clock, SCLK. $F_{delta}$ is a measured frequency between $F_s$ and actual frequency of the disk.

The second PLL circuit 930 receives as input the clock signal 920, divided by a factor, d, and provides a write clock output signal 940 for writing the sets of spiral servo reference tracks, having frequency $F_{WCLK}=F_{SCLK} \times m/d$. In some implementations, a phase of the write clock output signal 940 can be adjusted based on a compensation signal, WPHASE, generated by a phase error correction circuit as described in further detail below. An INTP circuit 990 may be configured to generate a signal that is a copy of the PLL output, i.e., generated clock signal 920. In some implementations, the output of the INTP circuit 990 may be delayed by a predetermined amount relative to the generated clock signal 920. In some implementations, the delay can be a fixed number, and may be selected as a fraction of a period of the generated clock signal 920.

Referring to FIG. 9B, a first PLL circuit 950 receives the clock oscillator signal 905 and generates a clock signal 960 that can be used, for example, to track seed spiral reference tracks on the medium surface. A second PLL circuit 970 also receives as input the clock signal 950 and provides a write clock output signal 980 for controlling the write head current in writing spiral servo reference tracks. The reference signals used in the first and second PLL circuits 950, 970 ($F_s$ and $F_w$) are used to control a frequency and phase of the clock signal 960 for tracking the seed spiral reference tracks and the clock signal 980 for controlling the write head current in writing spiral servo reference tracks.

In FIG. 9A, the write clock output signal 940 is generated from the generated clock signal 920. Accordingly, a frequency offset may be injected at a single location to eliminate potential errors due to a different response of the PLL circuit 910 to frequency error adjustment. The write clock output signal 940 may take longer to converge because the generated clock signal 920 would need to converge first.

The circuit arrangement of FIG. 9B addresses the convergence issue of FIG. 9A. The clock signal 960 and the write clock output signal 980 are generated concurrently. As such, a same frequency offset is injected into both PLL circuits 950, 970. In some examples, the PLL circuits 950, 970 may converge to the new frequency offset at different rates.

FIG. 10 is a table 1000 summarizing an example of clock usage details for each step of a spiral writing process. As shown, when writing first zone spiral servo reference tracks, a spiral read clock can be synchronized to a frequency of the seed spiral servo reference tracks (SCLK/$F_{seed}$), while a spiral write clock can be synchronized to a predetermined first zone frequency (WCLK/$F_{zone1}$). During writing of the concentric servo tracks, both the spiral read clock and the spiral write clock can be a same clock having the predetermined first zone frequency (SCLK/$F_{zone1}$). When tracking the boundary of the first zone, the spiral read clock can be synchronized to the frequency of the seed spiral servo reference tracks (SCLK/$F_{seed}$) and the frequency of the concentric servo tracks, which is the predetermined first zone frequency (WCLK/$F_{zone1}$). Subsequently, when writing first zone spiral servo reference tracks, the spiral read clock can be synchronized to the frequency of the seed spiral servo reference tracks (SCLK/$F_{seed}$), while a spiral write clock can be synchronized to a predetermined second zone frequency (WCLK/$F_{zone2}$). The read head then tracks a location from where it begins writing the second zone concentric servo tracks by tracking the frequency of the seed spiral servo reference tracks (SCLK/$F_{seed}$) and the frequency of the concentric servo tracks (SCLK/$F_{zone1}$). Again, during writing of the second zone concentric servo tracks, both the spiral read clock and the spiral write clock can be a same clock having the predetermined second zone frequency (SCLK/$F_{zone2}$).

Referring again to FIGS. 9A and 9B, an overall phase error during a PLL frequency lock is small as long as the PLL circuits track signals from a same clock source. Phase errors in the timing signals for reading and writing spiral servo reference tracks can be corrected by phase correction circuitry. In some implementations, a phase lock between two servo signals can be achieved by measuring a phase difference between the signals and generating a compensation signal to compensate for the difference. In an example of a scenario, clocks corresponding to seed spiral servo reference tracks and spiral servo reference tracks are assumed to have time periods A and B. Accordingly, a time between two synchronization points of the corresponding signals (known as sync time) can be a common multiple of time periods A and B. In some implementations, the two clock frequencies can be set such that the sync time is a multiple of a distance between two concentric servo tracks. A phase difference between the synchronization points can be measured, and a signal can be generated to compensate for this phase difference. For example, a signal WPHASE can be generated and input as shown in FIGS. 9A and 9B to compensate for the phase difference. In some implementations, the compensation can be in the form of a type 1 or type 2 control loop that uses the phase difference as an error function. In some implementations, the compensation amount can be decided by a closed loop control system. For example, the control system may be a proportional type or proportional-integral type control system.

FIG. 11 shows an example of phase error measurement. As shown, a single disk revolution 1100 is considered, along with sections of a spiral read clock signal (SCLK) 1110 and a spiral write clock (WCLK) 1120. The two clock signals are compared to identify a phase error 1130 in the two clock signals. The error can 1130 be expressed by counting a number of counts of a time stamp clock signal 1140 (e.g., 1 TSCLK). The time stamp clock can run faster than a fastest clock in the servo system. The time stamp clock can be a virtual clock (e.g., implemented by software) or a physical clock.

FIG. 12 shows an example of a magnetic-medium disk drive implementing a servo writing system. A PLL system 1205 (e.g., PLL circuits from FIG. 9A or 9B) can generate spiral read (SCLK) 1210 and spiral write (WCLK) 1220 clock signals. These signals are passed through sync point generators 1230, 1240 to identify a point in the SCLK and WCLK signals that can be used as clock synchronization points, which are then fed as pulses (SCLK_TS_PULSE and WCLK_TS_PULSE) 1244, 1246 into a time stamp circuit 1250. The time stamped signals (SCLK_TS and WCLK_TS) 1254, 1256, expressed in time stamp clock counts, are input to an error generator circuit 1260 that measures a phase difference between the signals and inputs the difference to a control circuit 1270. The control circuit 1270 in turn generates a compensation signal WPHASE 1275 to compensate for the phase difference between the spiral read (SCLK) 1210 and spiral write (WCLK) 1220 clock signals.

FIG. 13 is a flowchart showing an example of a zone servo writing process. The process can be implemented by a head-disk assembly and drive electronics of a magnetic-medium disk drive (e.g., head-disk assembly 200 and drive electronics 250 of FIG. 2). At 1300, a set of seed spiral servo reference tracks can be written to the medium. At the beginning of the servo writing process, the medium, e.g., a magnetic disk, is blank and thus the write head may not have timing feedback for accurately writing the seed spiral servo reference tracks. As a result, the seed spiral servo reference tracks can have widely varying ramp angles. At 1310, using the seed spiral servo reference tracks for timing, a first set of spiral servo reference tracks at a predetermined first zone frequency can be written to a first zone of the medium surface. A velocity of the write head for writing the first set of spiral servo reference tracks can be controlled based on timing information derived from the seed spiral servo reference tracks. In some implementations, a time base generator signal locked to disk rotation can be used to provide timing to track the seed spiral servo reference tracks.

At 1320, the write head can write a first set of concentric servo tracks to the first zone using timing information from the first set of spiral servo reference tracks to control the write head. The first set of servo tracks (first zone concentric servo tracks) can be written to the first zone at the same frequency as the first set of spiral servo reference tracks. In some implementations, a clock tracking the first set of spiral servo reference tracks and a write clock guiding the write head for writing the first set of servo tracks can operate on the same frequency. In some implementations, a single clock can be used to provide timing for tracking the first set of spiral servo reference tracks and the write head for writing the first set of servo tracks. Once the first set of servo tracks are written, the first set of spiral servo reference tracks can be ignored and/or overwritten.

At 1330, the first set of servo tracks and the set of seed spiral servo reference tracks are used to determine a radial position of the read/write head and position the head to begin writing the second set of spiral servo reference tracks. When tracking a boundary of the first zone, a spiral read clock can be synchronized to a frequency of the seed spiral servo reference tracks and a frequency of the first zone concentric servo tracks, which is the predetermined first zone frequency.

At 1340, the second set of spiral servo reference tracks can be written at a second frequency (that is different from the first frequency) to the second zone using the timing information from the set of seed spiral servo reference tracks. In some implementations, the second set of spiral servo reference tracks may overlap partially or completely the first set of spiral servo reference tracks written to the first zone. While writing the second set of spiral servo reference tracks to the second zone, care may taken to not overwrite the set of seed spiral servo reference tracks and the first set of servo tracks. At 1350, the write head can use the second set of spiral servo reference tracks and the first zone concentric servo tracks to determine the boundary between the first and second zones. The read/write head can then be positioned at this boundary to begin writing the second zone concentric servo tracks to the second zone using timing information from the second set of spiral servo reference tracks to control the head. At 1360, the second zone concentric servo tracks can be written to the second zone at the same frequency as the second set of spiral servo reference tracks. In some implementations, a single clock can be used to provide timing for tracking the second set of spiral servo reference tracks and the write head for writing the second zone concentric servo tracks. The frequency for writing the first zone concentric servo tracks is different from a frequency for writing the second zone concentric servo tracks. The process for the second zone described above can be repeated for each remaining zone on the medium. In this manner, each zone of the medium surface can be configured to have a similar bit density of the servo information. Additionally, a lower variation of bit density along the radial dimension of the medium surface can result in more consistent channel response.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

The invention claimed is:

1. A method comprising:
obtaining, through read circuitry, timing information for a machine-readable medium to determine head position; and
writing, by write circuitry, a first set of spiral servo reference tracks at a first frequency on a first zone of the medium and a second set of spiral servo reference tracks at a second, different frequency on a second zone of the medium,
wherein the second zone is different from the first zone; and
wherein at least one of the first and second sets of spiral servo reference tracks is written to the medium based on at least the timing information.

2. The method of claim 1 further comprising:
obtaining the timing information from seed spiral servo reference tracks written to the medium.

3. The method of claim 2, wherein the timing information is first timing information, the method further comprising:
obtaining second timing information from the first set of spiral servo reference tracks; and
writing a first set of concentric servo tracks to the medium based on at least the second timing information.

4. The method of claim 3, furthering comprising controlling a head for writing the second set of spiral servo reference tracks by tracking one or both of the first set of concentric servo tracks and the seed spiral servo reference tracks.

5. The method of claim 3, wherein the first set of concentric servo tracks is written to the medium at a same frequency as the first set of spiral servo reference tracks.

6. The method of claim 3, wherein a clock is used to track the first set of spiral servo reference tracks, further comprising writing the first set of concentric servo tracks to the medium based on the tracked first set of spiral servo reference tracks.

7. The method of claim 3, further comprising:
obtaining third timing information from the second set of spiral servo reference tracks; and
writing a second set of concentric servo tracks to the medium based on at least the third timing information, wherein the second set of concentric servo tracks is written to the medium at a same frequency as the second set of spiral servo reference tracks.

8. The method of claim 1, wherein a clock for tracking seed spiral servo reference tracks is synchronized to a rotation of the medium.

9. An apparatus comprising:
signal processing circuitry configured to obtain timing information for a machine-readable medium to determine head position; and
a servo track generator configured to generate a first set of spiral servo reference tracks at a first frequency on a first zone of the medium and a second set of spiral servo reference tracks at a second, different frequency on a second zone of the medium,
wherein the second zone is different from the first zone; and
wherein at least one of the first and second sets of spiral servo reference tracks is written to the medium based on at least the timing information.

10. The apparatus of claim 9 wherein the timing information is obtained from seed spiral servo reference tracks written to the medium.

11. The apparatus of claim 10, wherein the timing information is first timing information, and wherein second timing information is obtained from the first set of spiral servo reference tracks; and a first set of concentric servo tracks is written to the medium based on at least the second timing information.

12. The apparatus of claim 11, furthering comprising a head configured to write the second set of spiral servo reference tracks by tracking one or both of the first set of concentric servo tracks and the seed spiral servo reference tracks.

13. The apparatus of claim 11, wherein the first set of concentric servo tracks is written to the medium at a same frequency as the first set of spiral servo reference tracks.

14. The apparatus of claim 11, further comprising a clock configured to track the first set of spiral servo reference tracks, wherein the first set of concentric servo tracks is written to the medium based on the tracked first set of spiral servo reference tracks.

15. The apparatus of claim 11, wherein third timing information is obtained from the second set of spiral servo reference tracks, a second set of concentric servo tracks is written to the medium based on at least the third timing information, and the second set of concentric servo tracks is written to the medium at a same frequency as the second set of spiral servo reference tracks.

16. The apparatus of claim 9, further comprising a clock configured to track seed spiral servo reference tracks that is synchronized to a rotation of the medium.

17. A system comprising:
a head-disk assembly comprising a machine-readable medium; and
drive electronics comprising:
signal processing circuitry configured to obtain timing information for the machine-readable medium to determine head position; and
a servo track generator configured to generate a first set of spiral servo reference tracks at a first frequency on a first zone of the medium and a second set of spiral servo reference tracks at a second, different frequency on a second zone of the medium,
wherein the second zone is different from the first zone; and
wherein at least one of the first and second sets of spiral servo reference tracks is written to the medium based on at least the timing information.

18. The system of claim 17 wherein the timing information is obtained from seed spiral servo reference tracks written to the medium.

19. The system of claim 18, wherein the timing information is first timing information, and wherein second timing information is obtained from the first set of spiral servo reference tracks; and a first set of concentric servo tracks is written to the medium based on at least the second timing information.

20. The system of claim 19, wherein third timing information is obtained from the second set of spiral servo reference tracks, a second set of concentric servo tracks is written to the medium based on at least the third timing information, and the second set of concentric servo tracks is written to the medium at a same frequency as the second set of spiral servo reference tracks.

* * * * *